United States Patent
Kobayashi

(10) Patent No.: US 9,010,509 B2
(45) Date of Patent: Apr. 21, 2015

(54) RATCHET DRIVE FOR A RATCHET WRENCH

(75) Inventor: Shigeki Kobayashi, Nagano (JP)

(73) Assignee: SP Air Kabushiki Kaisha, Nagano (JP)

( * ) Notice: Subject to any disclaimer, the term of this patent is extended or adjusted under 35 U.S.C. 154(b) by 1381 days.

(21) Appl. No.: 11/688,932

(22) Filed: Mar. 21, 2007

(65) Prior Publication Data

US 2008/0142329 A1 Jun. 19, 2008

Related U.S. Application Data

(60) Provisional application No. 60/870,237, filed on Dec. 15, 2006.

(51) Int. Cl.
*B25B 21/00* (2006.01)
*F16D 41/16* (2006.01)

(52) U.S. Cl.
CPC .............. *F16D 41/16* (2013.01); *B25B 21/004* (2013.01)

(58) Field of Classification Search
CPC ................................ F16D 41/16; B25B 21/004
USPC .................. 81/62, 61–63.2, 57.39, 57.29, 60; 192/43.1, 43.2, 46; 173/49, 104, 110, 173/218
See application file for complete search history.

(56) References Cited

U.S. PATENT DOCUMENTS

| | | | |
|---|---|---|---|
| 1,101,442 A * | 6/1914 | Hooker | 81/62 |
| 2,097,594 A * | 11/1937 | Kress | 81/62 |
| 2,193,984 A * | 3/1940 | Rhinevault | 192/43.2 |
| 2,264,012 A | 11/1941 | Wasson | |
| 2,430,480 A * | 11/1947 | Pugh | 192/43.2 |
| 2,712,256 A | 7/1955 | Fish | |
| 3,270,595 A | 9/1966 | Hall et al. | |
| 3,608,683 A | 9/1971 | Fujisawa | |
| 3,867,855 A * | 2/1975 | Siebert | 81/63.1 |
| 4,091,890 A * | 5/1978 | Wilmeth et al. | 81/57.39 |
| 4,259,883 A | 4/1981 | Carlson | |
| 4,346,630 A | 8/1982 | Hanson | |
| 4,497,227 A * | 2/1985 | Stasiek | 81/63.1 |
| 4,722,252 A | 2/1988 | Fulcher et al. | |
| 4,993,288 A | 2/1991 | Anderson et al. | |
| 5,450,773 A | 9/1995 | Darrah et al. | |
| 5,533,427 A * | 7/1996 | Chow | 81/63.2 |
| 5,535,646 A | 7/1996 | Allen et al. | |
| 5,738,192 A | 4/1998 | Miner | |
| 6,308,594 B1 | 10/2001 | Cheng | |

(Continued)

*Primary Examiner* — Gene Crawford
*Assistant Examiner* — Terry Chau
(74) *Attorney, Agent, or Firm* — Senniger Powers LLP

(57) ABSTRACT

A powered ratchet drive for a ratchet wrench includes a pair of elongate pawls for driving an output member of the wrench. Each pawl may have a lower portion pivotally attached to a rocker and an upper portion comprising teeth for engagement with teeth of the output member to turn the output member. The upper portion of the pawl extends outward at an angle with respect to the lower portion. The ratchet may include a compression spring secured inside a cavity of each pawl for biasing the pawl into engagement with the output member. The ratchet also includes a reversing switch mechanism for selectively configuring the ratchet in a forward-driving configuration and in a reverse-driving configuration. The switch mechanism includes a cam disposed between the pawls. The cam has a groove for receiving one of the pawls during operation depending on the configuration of the ratchet.

10 Claims, 15 Drawing Sheets

(56) References Cited

U.S. PATENT DOCUMENTS

| | | |
|---|---|---|
| 6,578,643 B2 | 6/2003 | Izumisawa |
| 6,584,875 B1 * | 7/2003 | Deng .............................. 81/63.1 |
| 2002/0117028 A1 * | 8/2002 | Kusama ........................ 81/57.39 |
| 2004/0089108 A1 * | 5/2004 | Chang ................................ 81/62 |

* cited by examiner

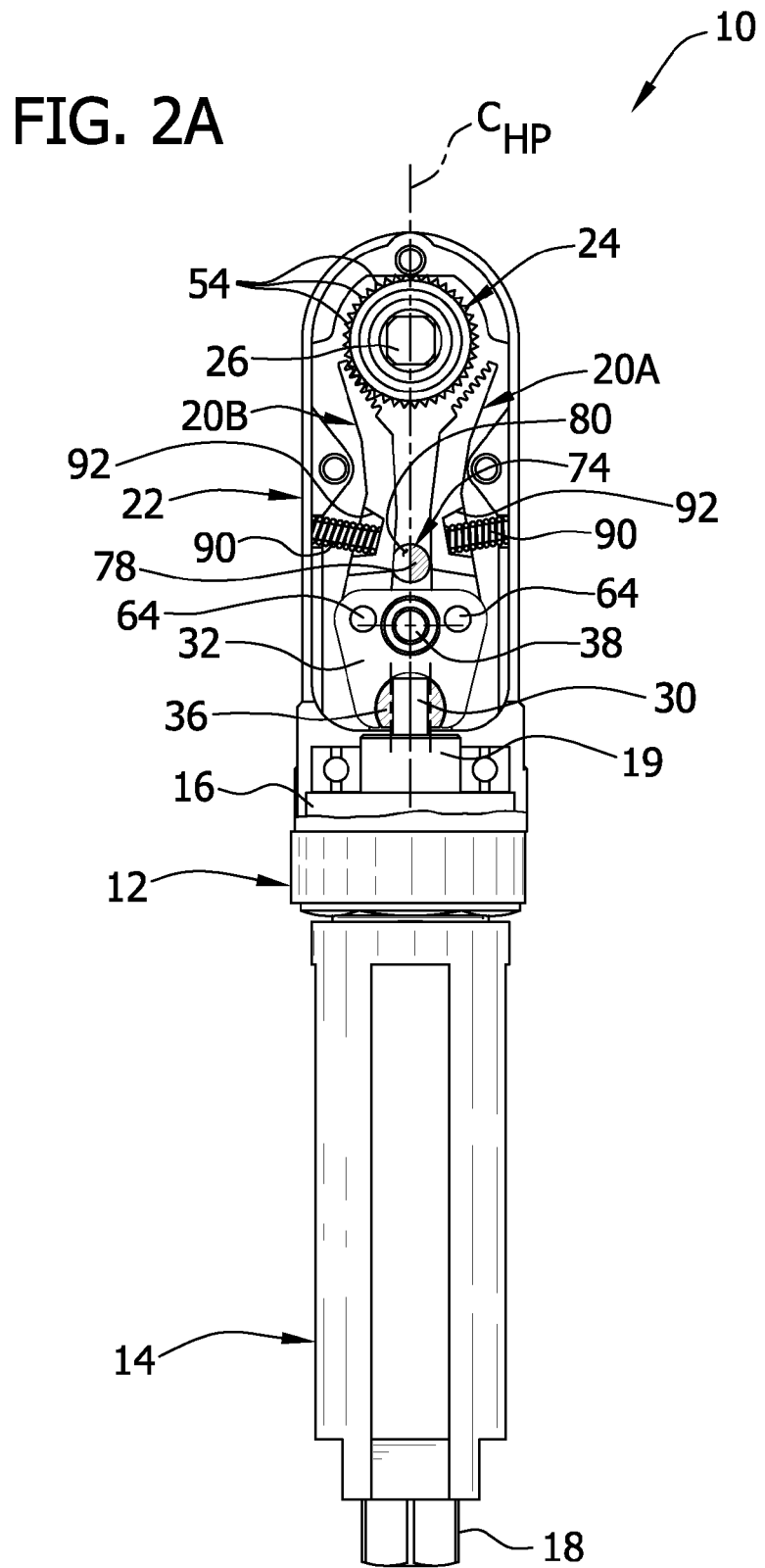

RATCHET DRIVE FOR A RATCHET WRENCH

CROSS-REFERENCE TO RELATED APPLICATION

This application claims the benefit of U.S. Provisional Application No. 60/870,237, filed Dec. 15, 2006, the entirety of which is herein incorporated by reference.

FIELD OF THE INVENTION

The present invention generally relates to a ratchet drive and more particularly to a ratchet drive for a ratchet wrench.

BACKGROUND OF THE INVENTION

The invention is especially concerned with a powered ratchet wrench that rotates an output member with a socket for turning a fastener element such as a bolt or a nut. Wrenches of this type are useful in automotive repair and industrial applications. Conventionally, pneumatic ratchet drive wrenches comprise an air motor for powering the wrench, an internal ratchet mechanism for transferring motion of the motor and an output member for transmitting such motion to a workpiece. Put simply, the internal ratchet mechanism typically includes a rotating offset shaft spinning with the air motor that in turn pivots a rocker having pawls pivotally attached to the rocker which repeatedly engage a set of teeth on the output member, causing the member to rotate in a desired direction. During each rotation of the air motor, the output member is rotated a fraction of a revolution. By repeatedly engaging the output member and rotating it only a short distance, great mechanical advantage is obtained and the high-speed rotation of the air motor is readily converted to a high-torque, yet more slowly rotating, output member. These advantages are well understood in the relevant art.

SUMMARY OF THE INVENTION

In one aspect of the present invention, a ratchet drive generally comprises a housing having a head with a longitudinal centerline and a motor disposed in the housing. The motor includes a rotatable drive shaft. A rocker is disposed pivotably within the head of the housing and is operatively connected to the drive shaft so that rotation of the drive shaft causes oscillation of the rocker. An output member has teeth. The output member is mounted in the head of the housing for rotation about its longitudinal axis and projects from the head for transmitting torque to an object. A pair of elongate pawls are pivotably attached to the rocker. Each pawl has a lower portion pivotally secured to the rocker and extends upward. An upper portion of each pawl comprises teeth for engagement with the output member teeth to turn the output member. The upper portion extends outward at angle with respect to the lower portion.

In another aspect, a ratchet drive generally comprises a housing having a head with a longitudinal centerline and a motor disposed in the housing. The motor includes a rotatable drive shaft. A rocker is disposed pivotably within the head of the housing and is operatively connected to the drive shaft so that rotation of the drive shaft causes oscillation of the rocker. An output member has teeth. The output member is mounted in the head of the housing for rotation about its longitudinal axis and projects from the head for transmitting torque to an object. A pawl pivotally secured to the rocker is shaped and sized for engagement with the output member teeth to turn the output member. The pawl defines a cavity therein. A compression spring engages the housing and inside the cavity of the pawl for biasing the pawl toward the centerline of the head and into engagement with the output member.

In yet another aspect, a ratchet drive generally comprises a housing having a head with a longitudinal centerline and a motor disposed in the housing. The motor includes a rotatable drive shaft. A rocker is disposed pivotably within the head of the housing and is operatively connected to the drive shaft so that rotation of the drive shaft causes oscillation of the rocker. An output member has teeth. The output member is mounted in the head of the housing for rotation about its longitudinal axis and projects from the head for transmitting torque to an object. A forward pawl and a reverse pawl is pivotally secured to opposite sides of the rocker and is shaped and sized for engagement with the output member teeth to turn the output member. A reversing switch mechanism configures the ratchet drive between a forward-driving configuration, in which the forward pawl engages the teeth of the output member and for driving the output member clockwise and the reverse pawl does not engage the teeth of the output member, and a reverse-driving configuration, in which the reverse pawl engages the teeth of the output member for driving the output member counterclockwise and the forward pawl does not engage the teeth of the output member. The reversing switch mechanism comprises a cam disposed between the pawls. The cam has a groove and is mounted on the housing for moving between the forward-driving configuration in which the groove receives the forward pawl and the reverse-driving configuration in which the groove receives the reverse pawl.

Other features will be in part apparent and in part pointed out hereinafter.

BRIEF DESCRIPTION OF THE DRAWINGS

FIG. 2A is a front elevation of the ratchet drive wrench with an access plate removed and parts broken away to show internal components;

Corresponding reference characters indicate corresponding parts throughout the drawings.

DESCRIPTION OF THE PREFERRED EMBODIMENTS

Figure 1:
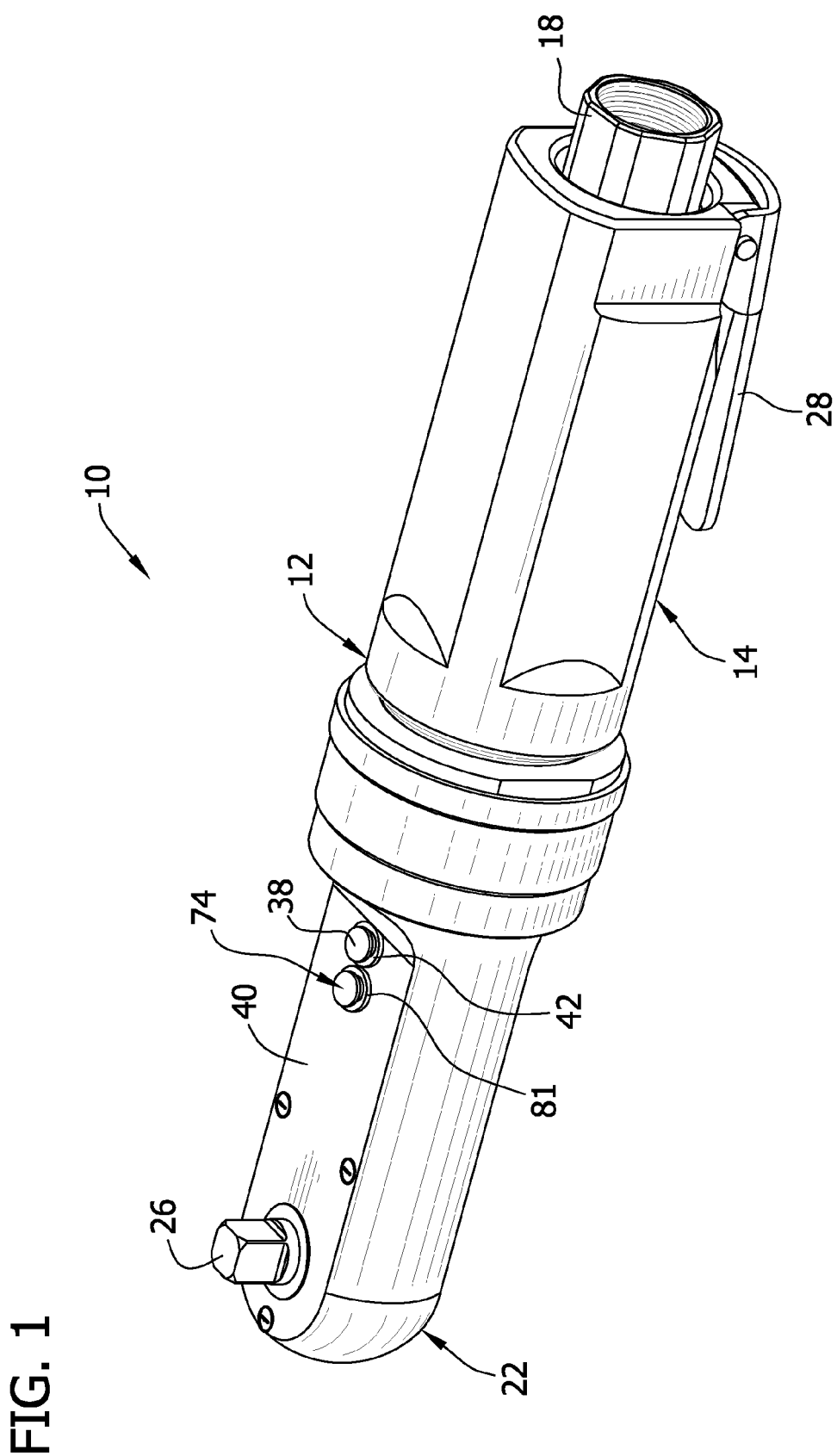
FIG. 1 is a perspective of one embodiment of a ratchet drive wrench.
Figure 2:
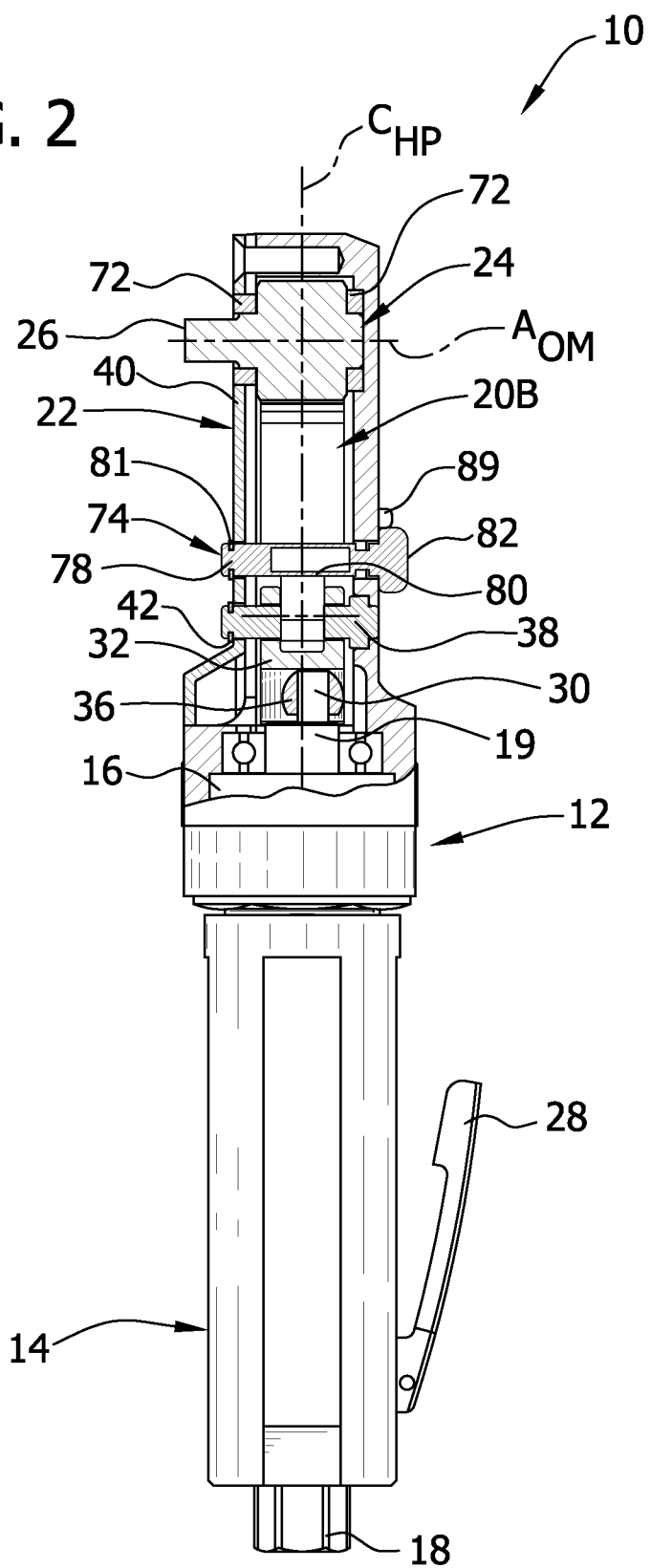
FIG. 2 is a right side, partial section of the ratchet drive wrench.
Figure 3:
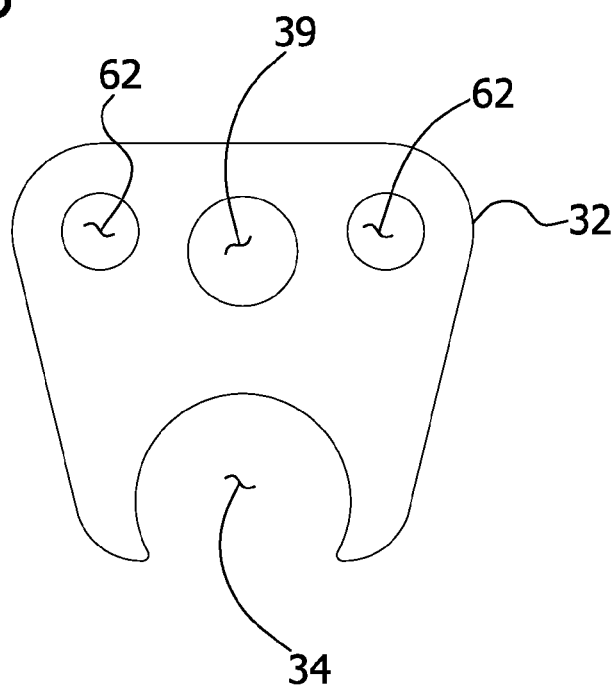
FIG. 3 is a front elevation of a rocker of the ratchet drive wrench.
Figure 4:
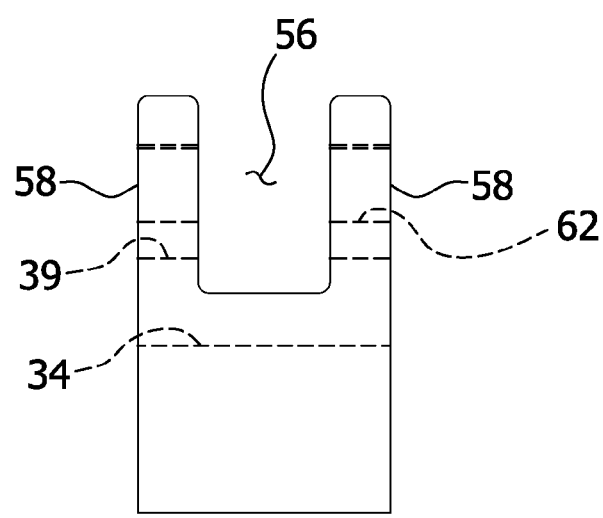
FIG. 4 is a side elevation of the rocker.

Referring now to the drawings and particularly to FIGS. 1-2A, one embodiment of a pneumatic ratchet drive wrench constructed according to the principles of the present invention is generally indicated at 10. A housing 12 encases components of the ratchet wrench 10. A lower portion 14 is sized and shaped to be held in one hand. The lower portion 14 of the housing 12 includes an air motor 16, which receives air from an air source (not shown) via an air inlet 18 at a bottom of the housing. Briefly, rotational movement of a drive shaft 19 of the air motor 16 is translated to generally up and down and lateral side-to-side movement of a forwarding pawl, generally indicated at 20A, and a reversing pawl, generally indicated at 20B, both of which are located in a head portion 22 of the ratchet wrench 10 (FIG. 2A). This up and down and side-to-side movement of the pawls 20A, 20B rotates an output member 24 of the ratchet wrench 10. A male socket fitting 26 extends from the output member 24 for mating with a socket (not shown) for transmitting torque to an object.

The function and operation of the air motor 16 are well known in the art. Briefly, the air motor operates to translate the energy of pressurized air into rotational motion of the drive shaft 19. A trigger 28 controls a valve (not shown) for selectively introducing pressurized air into the housing 12 to drive the air motor 16. The drive shaft 19 has an eccentric projection 30 extending from the distal end of the shaft. The eccentric projection 30 is offset from a rotational axis of the drive shaft 19, so that as viewed from the front (FIG. 2A), rotation of the shaft causes the eccentric projection to move laterally side-to-side.

Referring to FIGS. 2-4 and 11B-16, the eccentric projection 30 is pivotally secured to a rocker 32 in the head portion 22 for oscillating the rocker in a lateral side-to-side movement, which, in turn oscillates the pawls 20 generally up and down and side-to-side, as described above. The eccentric projection 30 is pivotally secured within a cavity 34 (FIGS. 3 and 11B) of the rocker 32. A rotatable bushing 36 that rotates freely upon a vertical axis $A_{EP}$ (FIG. 11B) of the eccentric projection 30 is in continuous sliding contact with and acts as an interface between the projection and the rocker 32, ensuring smooth movement between the rocker and drive shaft 19. The rocker 32 is pivotally secured to the housing 12 by a rocker pivot 38. The rocker pivot 38 comprises a shaft passing through an opening 39 (FIGS. 3 and 4) in the rocker 32 and through the head portion 22 of the housing 12. The head portion 22 includes an access plate 40 (FIGS. 1 and 2), which is removed in FIG. 2A. The rocker pivot 38 is secured to the housing 12 in the proper position by a snap-fit ring 42. The rocker 32, pivoting freely about the rocker pivot 38, transforms the rotational energy of the air motor 16 to a lateral pivoting motion.

Figure 5:
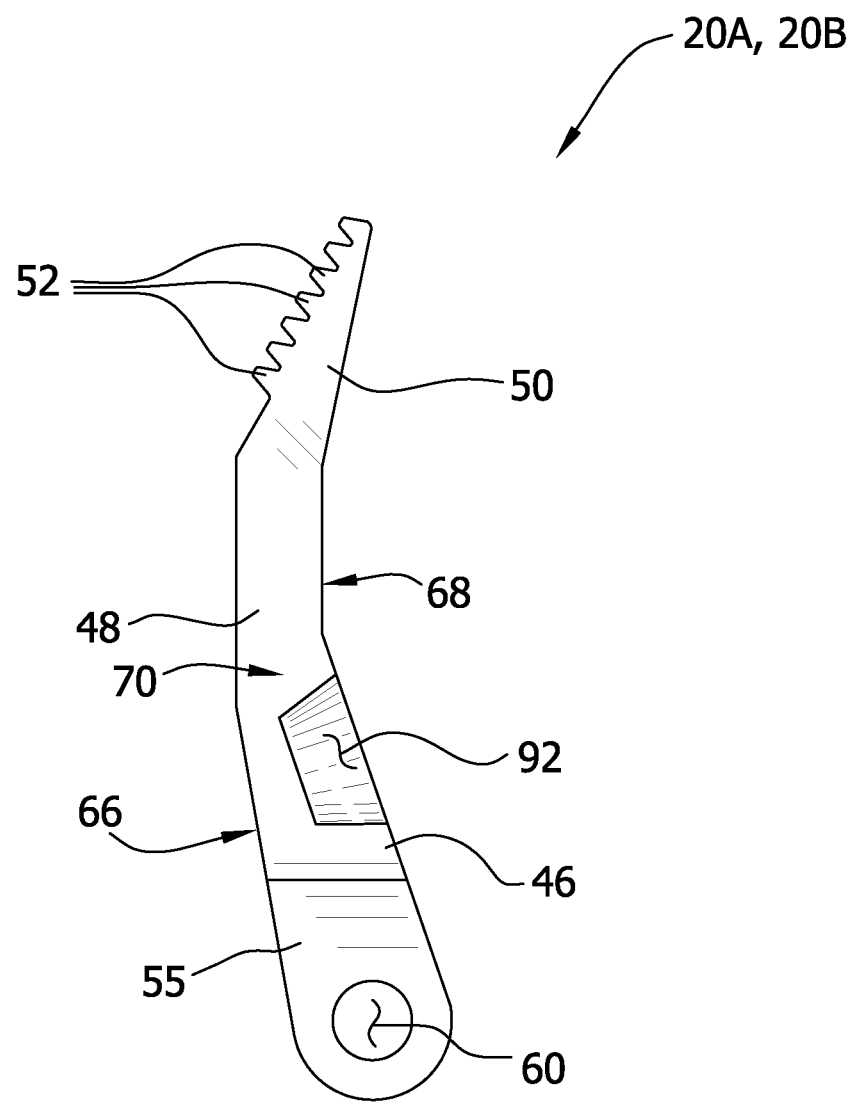
FIG. 5 is a right side elevation of a reversing pawl of the ratchet drive wrench.
Figure 6:
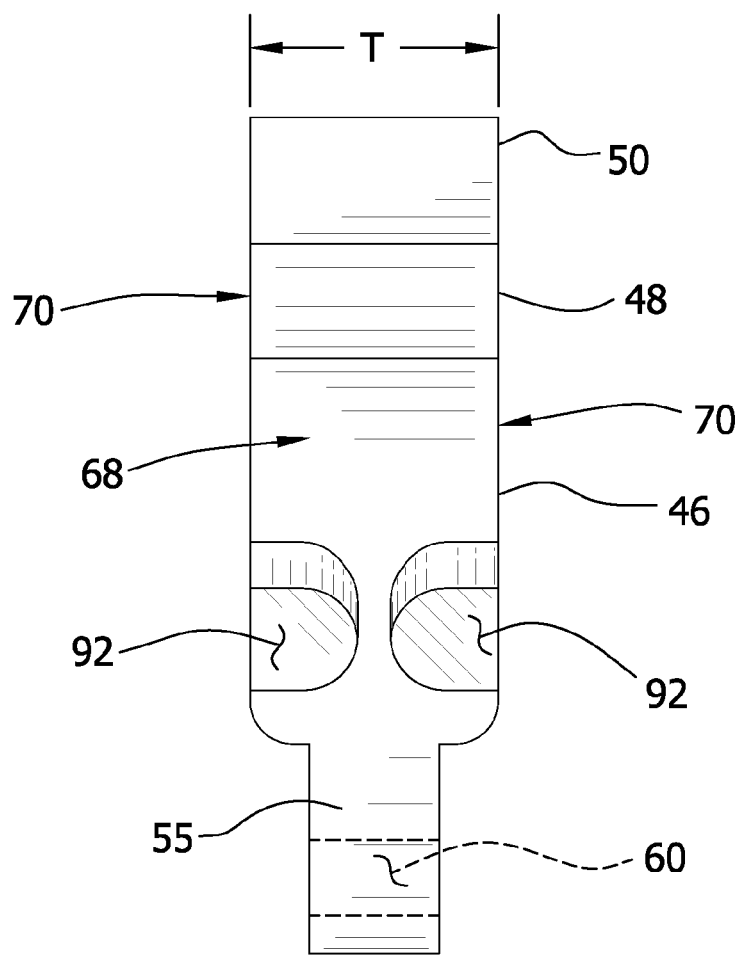
FIG. 6 is a rear elevation of the reversing pawl of the ratchet drive wrench.
Figure 7:
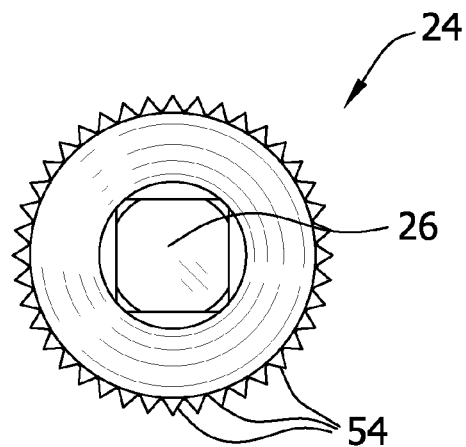
FIG. 7 is a front elevation of an output member of the ratchet drive wrench.
Figure 8:
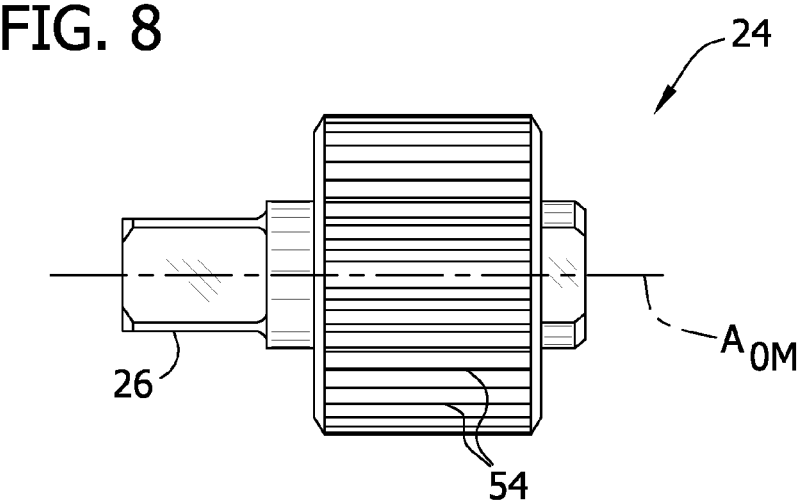
FIG. 8 is a right side elevation of the output member.
Figure 9:
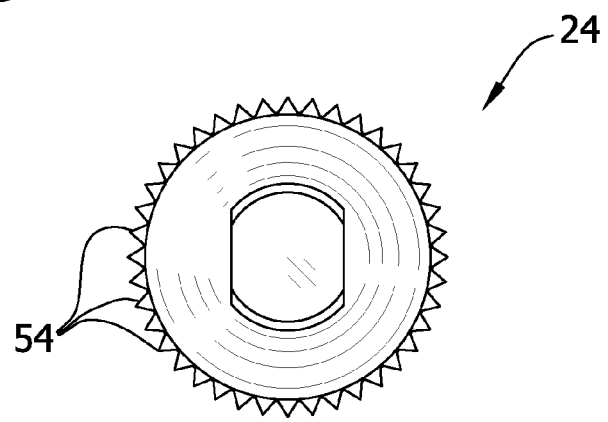
FIG. 9 is a rear elevation of the output member.
Figure 10:
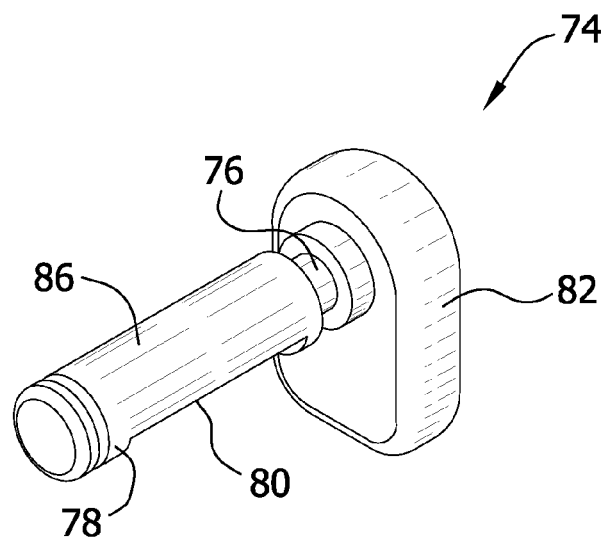
FIG. 10 is a perspective of a reversing switch of the ratchet drive wrench.
Figure 11:
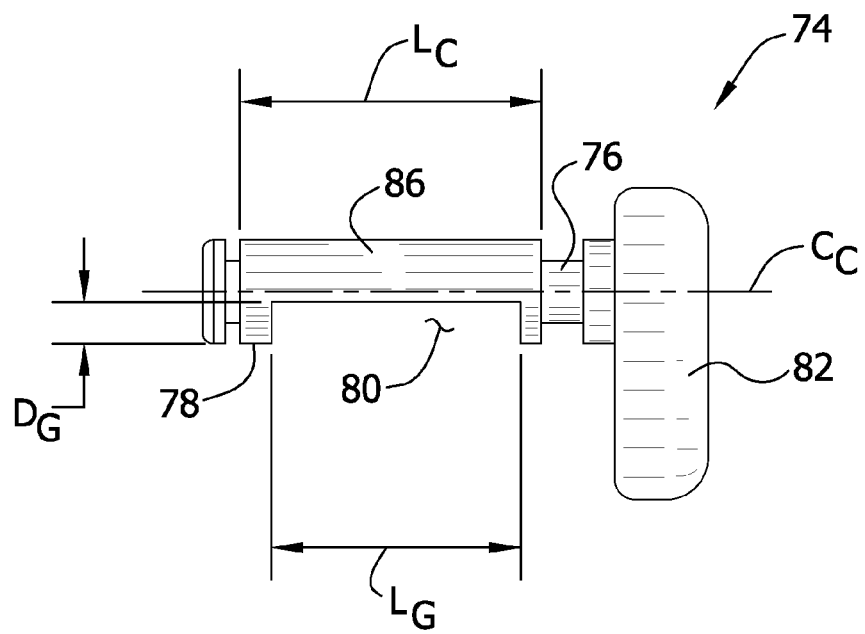
FIG. 11 is a right side elevation of the reversing switch.
Figure 11A:
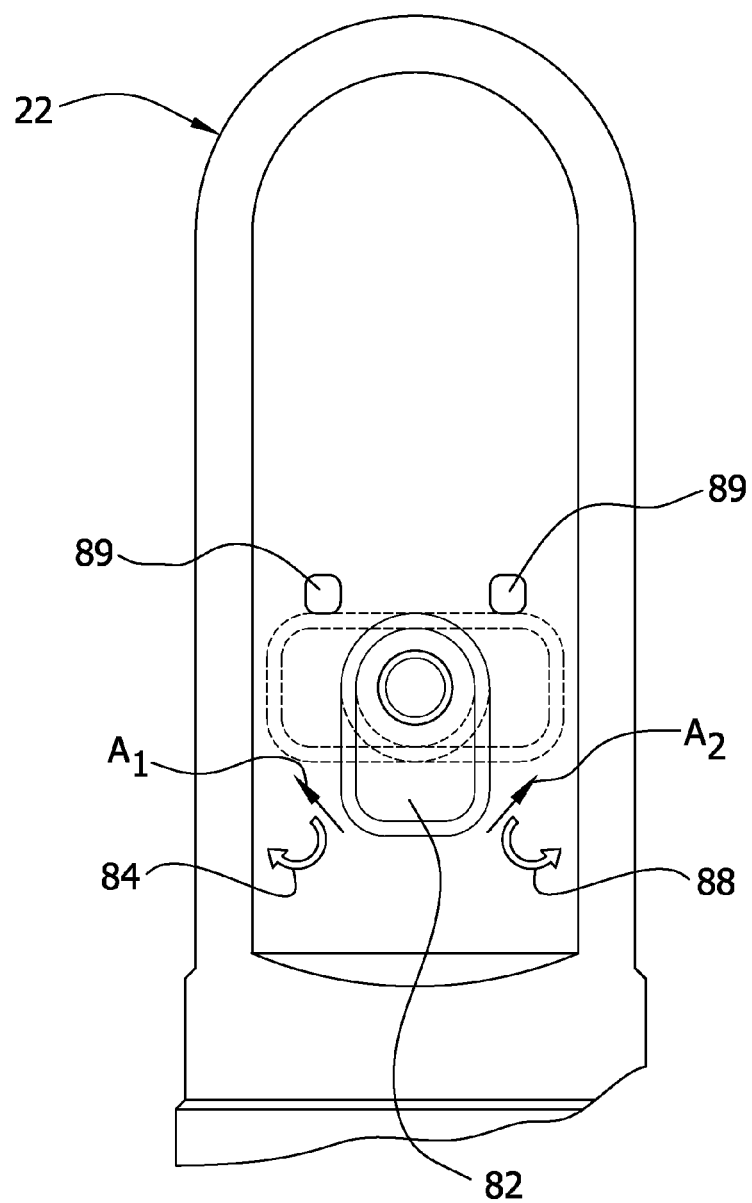
FIG. 11A is a fragmentary rear elevation of the ratchet drive wrench.
Figure 11B:
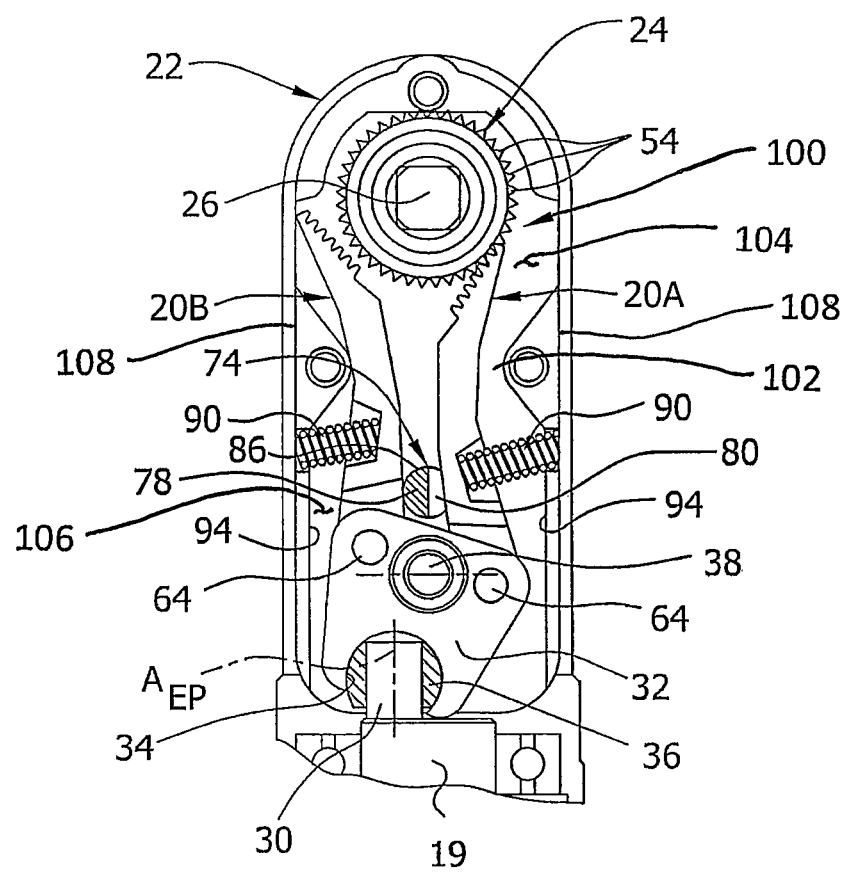
FIG. 11B is an enlarged fragmentary front elevation similar to FIG. 2A but with a forwarding pawl shown in its initial drive position seated against the output member.

Referring to FIGS. 5, 6 and 11B, the forwarding pawl 20A, which drives the output member 24 counterclockwise (as viewed in FIG. 11B), and the reversing pawl 20B, which drives the output member clockwise (as viewed in FIG. 11B), are both pivotally secured to the rocker 32. The forwarding and reversing pawls 20A, 20B are structurally identical to one another, and are secured to opposite sides of the rocker 32. The pawls 20A, 20B extend generally upward so that they do not cross each other. Referring particularly to FIGS. 5 and 6, each pawl 20A, 20B includes a lower portion 46, an intermediate portion 48 extending upward at an angle from the lower portion and an upper portion 50 extending upward at an angle from the intermediate portion. The upper portion 50 of each pawl 20A, 20B includes a plurality of teeth 52 for engaging teeth 54 of the output member 24 to drive the output member in the respective direction (see, FIG. 2A).

Referring to FIGS. 2A-6, each pawl 20A, 20B is pivotally secured to the rocker 32 by inserting a thin section 55 (FIGS. 5 and 6) of the lower portion 46 of the pawl into a recess 56 of the rocker defined by opposing flanges 58 (FIG. 4) so that an opening 60 through the thin section of the pawl is aligned with a respective pair of pawl holes 62 (FIGS. 3 and 4) extending through the flanges. Pawl pins 64 (FIG. 2A), about which the pawls 20A, 20B may pivot within the recess 56, are inserted through the pawl holes 62 and the openings 60 in the lower portions 46 of the pawls 20A, 20B. Referring to FIG. 5, each pawl includes an inner face 66, an outer face 68 and opposite side faces 70, each of the faces being designated generally. Each pawl also has a maximum thickness T (FIG. 6). When the pawls 20A, 20B are secured to the rocker 32, the inner faces 66 of the pawls 20A, 20B are in opposing relationship with each other and face a centerline $C_{HP}$ (FIG. 2A) of the head portion 22 of the ratchet 10. In one example, the intermediate portion 48 of each pawl 20A, 20B extends laterally outward from the lower portion 46 at an angle of about 19 degrees, and the upper portion 50 extends laterally outward from the intermediate portion at angle of about 30 degrees. The upper portion 50 of each pawl 20A, 20B is offset from the lower portion 46 about 49 degrees. This configuration allows for the upper portion 50 and the teeth 52 of each pawl 20A, 20B to move along the circumference of the output member 24 as the pawl moves laterally from side-to-side and upward and downward.

Referring back to FIG. 2, the housing 12 supports the output member 24 for rotation about a longitudinal axis $A_{OM}$ of the output member. Opposing annular bushings 72 disposed between the output member 24 and the housing 12 properly align and position the output member 24 within the wrench 31 and act as a removable wear surface for the output member.

Referring to FIGS. 2A, 11B-16, only one of the pawls 20A, 20B engages and drives the output member 24 at any one time, depending on an operation of the ratchet 10. The ratchet 10 is configurable between a forward-driving operation, in which the forwarding pawl 20A engages the output member 24 and drives the output member counterclockwise (as viewed in FIG. 11B), and a reverse-driving operation (FIGS. 2A and 12-16), in which the reversing pawl 20B engages the output member and drives the output member clockwise (as viewed in FIGS. 12-16). Referring to FIGS. 2A and 10-16, a reversing switch 74 operates to configure the ratchet 10 between the forward-driving operation and the reverse-driving operation. The reversing switch 74 includes a cylindrical shaft 76 and a concentric, cylindrical cam 78 extending radially outward from the shaft. The cam 78 includes a groove or cutout 80 extending along a majority of its length $L_C$ (see, FIGS. 10 and 11). The groove 80 may be formed in any suitable manner. For reasons which will become apparent, a length $L_G$ of the groove 80 is slightly larger than the thicknesses T of the pawls 20A, 20B, and a depth $D_G$ of the groove 80 extends generally adjacent to a centerline $C_C$ of the cam 78 so that a circumference of the cam at the groove is reduced generally to half of the circumference of the cam or slightly larger than half.

Referring to FIGS. 2, 2A and 11B-16, the cam 78 is disposed within the head portion 22 of the housing 12 between the pawls 20A, 20B and is rotatably secured to the head portion 22 by a snap-ring 81 (FIGS. 1 and 2). A lever 82 connected to the shaft 76 is disposed outside the head portion 22 at the rear side of the ratchet wrench 10. The lever 82 allows a user to rotate the cam 78 to configure the ratchet 10 between the forward-driving operation and the reverse-drive operation. Referring to FIG. 11A, to configure the ratchet 10 in the forward-driving configuration, the user rotates the lever 82 clockwise (as indicated by arrow $A_1$) so that the lever is disposed above the forward-indicia 84 on the housing 12 indicating the forward-driving configuration. As shown in FIG. 11B, rotating the lever 82 in this direction positions the cam 78 so that the groove 80 faces the forward pawl 20A and an engagement surface 86 of the cam contacts the reversing pawl 20B and pushes it laterally away from the output member 24. To configure the ratchet 10 in the reverse-driving configuration, the user rotates the lever 82 counterclockwise (as indicated by arrow $A_2$) about 180 degrees from its forward-driving position, so that the lever is disposed over the reverse-indicia 88 indicating the reverse-driving configuration. Rotating the lever 82 in this direction positions the cam 78 so that the groove 80 faces the reversing pawl 20B and the engagement surface 86 of the cam contacts the forwarding pawl 20A and pushes it laterally away from the output member 24. Stops 89 projecting from the rear of the head portion 22 aid in properly positioning the cam 78 and prevent the lever 82 from rotating 360 degrees.

To prevent the respective pawl 20A, 20B that is engaging the output member 24, more specifically the teeth 52 of the pawl that is operating, from slipping off the output member, compression springs 90 engage respective ones of the pawls 20A, 20B, biasing the pawls inward, toward the centerline $C_{HP}$ of the head portion 22. The lower portion 46 of each pawl 20A, 20B includes a pair of cavities 92 (broadly, spring seats) for receiving end margins of the compression springs 90. Each cavity 92 is formed in the outer face 68 of the respective pawl 20A, 20B and extends through a respective side face 70. Side walls of the cavities 92 flare outwardly in cross-sectional area from bottoms of the cavities to the outer face 68. Other shapes that permit movement of the springs 90 relative to the cavities 92 as the pawls 20A, 20B pivot can be used. The opposite ends of the compression springs 90 are secured to an inner surface 94 of the housing 12 to force the pawls 20A, 20B inward toward the centerline $C_{RW}$. The arrangements of the compression springs 90 simplify the assembly process. Also, compression springs are less expensive than custom-made springs specific to a particular ratchet wrench. As illustrated in FIG. 11B, the head portion or head 22 includes an interior cavity 100 having a neck 102 separating an upper part 104 and a lower part 106. The neck 102 is defined by opposing bosses or elements 108 protruding into the interior cavity 100. The rocker 32 is disposed in the lower part 106 of the interior cavity 100. The output member 24 is mounted in the upper part 105 of the interior cavity 100 in the head 22. Each pawl 20A, 20B has a lower portion 46 pivotally secured to the rocker 32 in the lower part 106 of the interior cavity 100. Each pawl 20A, 20B extends upward past the neck 102 of the interior cavity 100 and has an upper portion 50 in the upper part 104 of the interior cavity in the head 22.

Figure 12:
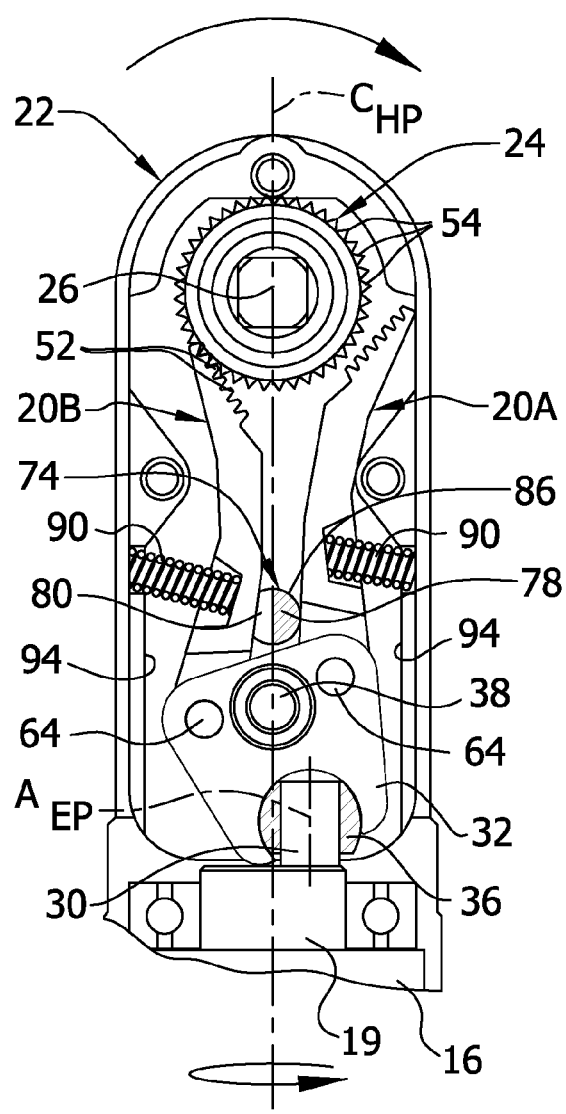
FIG. 12 is the elevation of FIG. 11B with a reversing pawl shown in its initial drive position seated against the output member.

Referring to FIGS. 12-16, the operation of the reversing pawl 20B is illustrated. The reversing switch 74 is positioned so that the groove 80 is facing the inner face 66 of the reversing pawl 20B, and the engagement surface 86 of the cam 78 forces the forwarding pawl 20A away from the output member 24. In an initial position at the beginning of an upstroke of the reversing pawl 20B, as illustrated in FIG. 12, the eccentric projection 30 is positioned generally to the right of the centerline $C_{HP}$ of the head portion 22 causing the rocker 32 to tilt to the left, whereby the upper portion 50 of the reversing pawl 20B is below the upper portion of the forwarding pawl 20A. The lower portion 46 of the reversing pawl 20B is received in the groove 80 of the cam 78 and the intermediate portion 48 of the pawl is generally adjacent and parallel to the centerline $C_{HP}$ of the head portion 22. The upper portion 50 of the reversing pawl 20B extends laterally outward at an angle with respect to the centerline $C_{HP}$ and only upper ones of the teeth 52 of the reversing pawl engage the output member 24.

Figure 13:
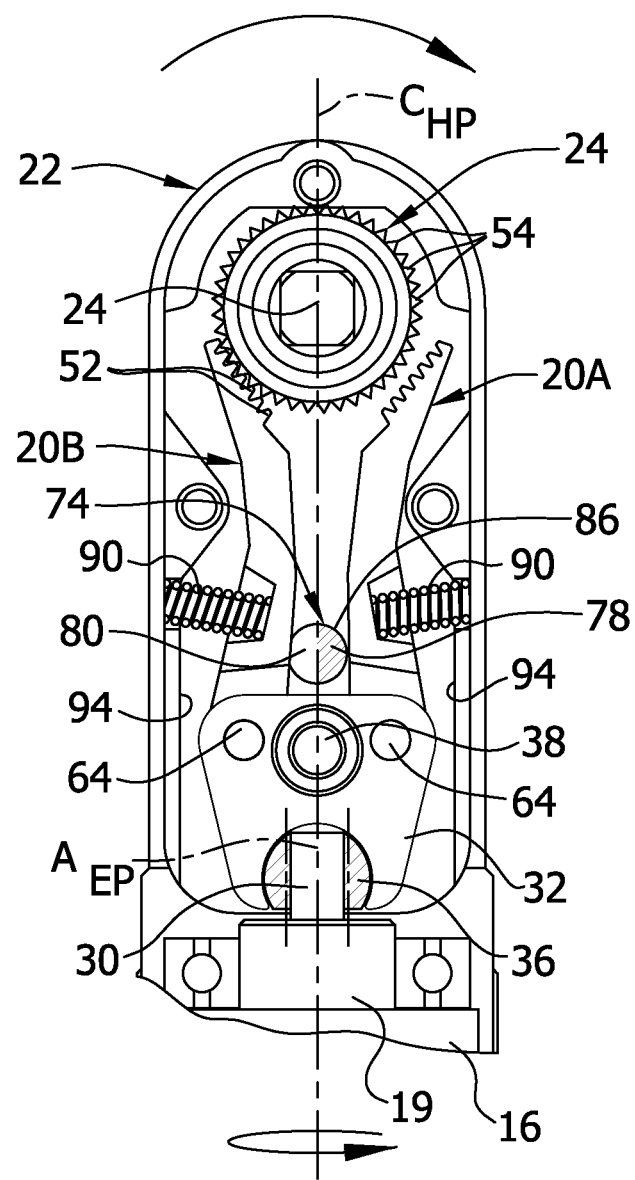
FIG. 13 is the elevation of FIG. 11B with the reversing pawl shown midway through its driving stroke positioned against the output member.
Figure 14:
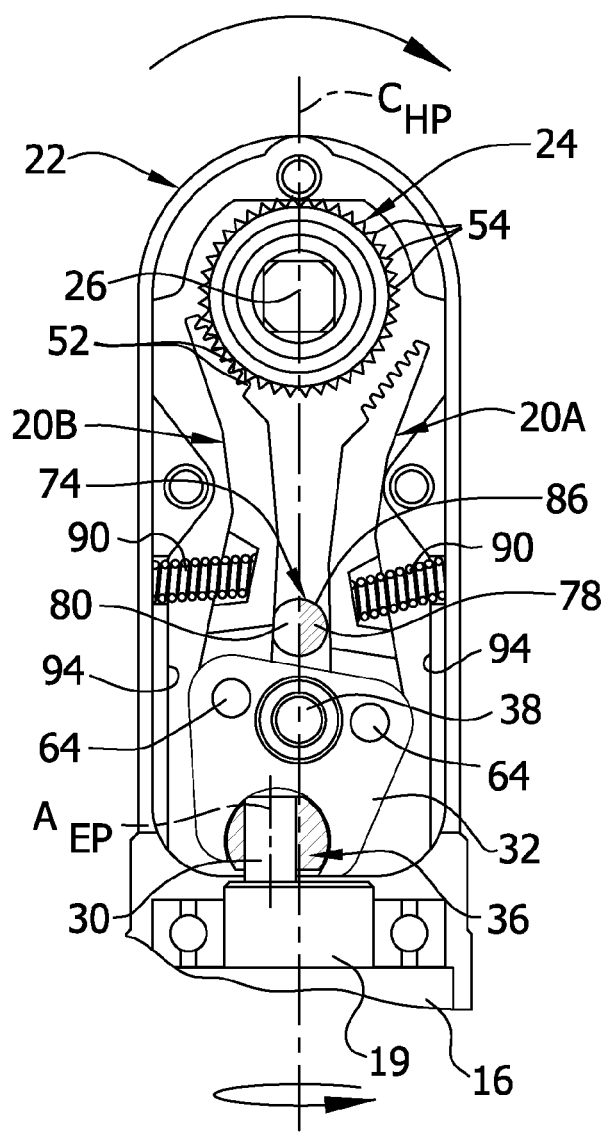
FIG. 14 is the elevation of FIG. 11B with the reversing pawl shown in its fully-extended position against the output member.

As the drive shaft 19 continues to rotate, the eccentric projection 30 moves laterally to the left so that it is aligned with the centerline $C_{HP}$ (FIG. 13). The rocker 32 pivots, thereby moving the reversing pawl 20B upward and laterally outward and driving the output member clockwise, (as viewed in FIG. 13). The eccentric projection 30 continues to move to the left of the centerline $C_{HP}$ (FIG. 14) whereby the reversing pawl 20B continues to move upward and laterally outward away from the centerline $C_{HP}$ and rotate the output member 24 clockwise.

Figure 15:
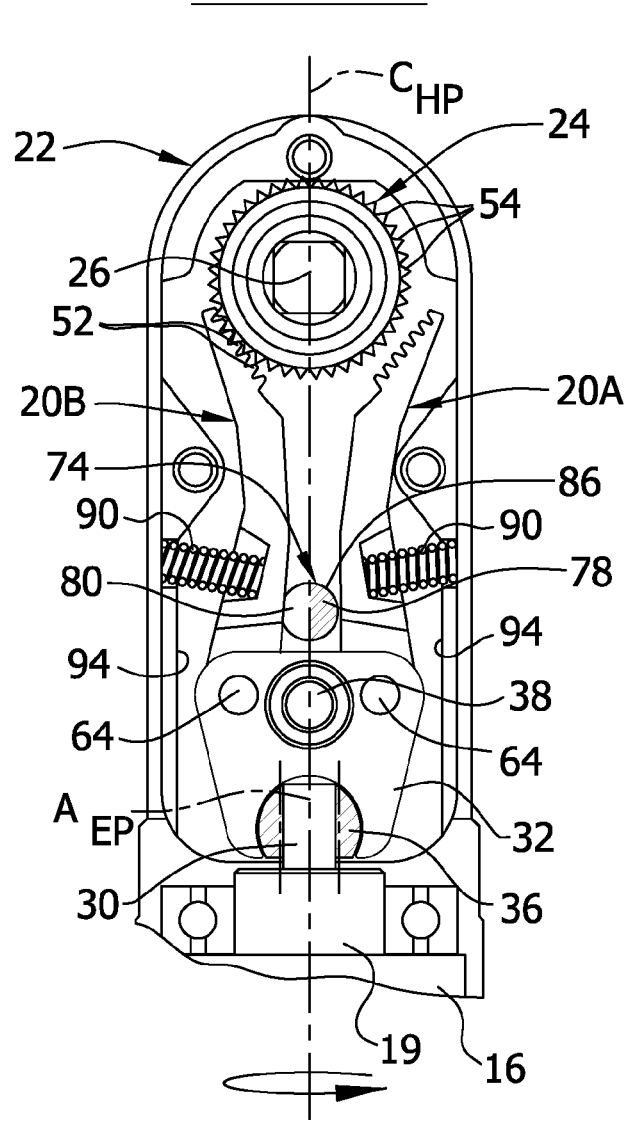
FIG. 15 is the elevation of FIG. 11B with the reversing pawl shown midway through its return stroke as it returns toward the start of another driving stroke.
Figure 16:
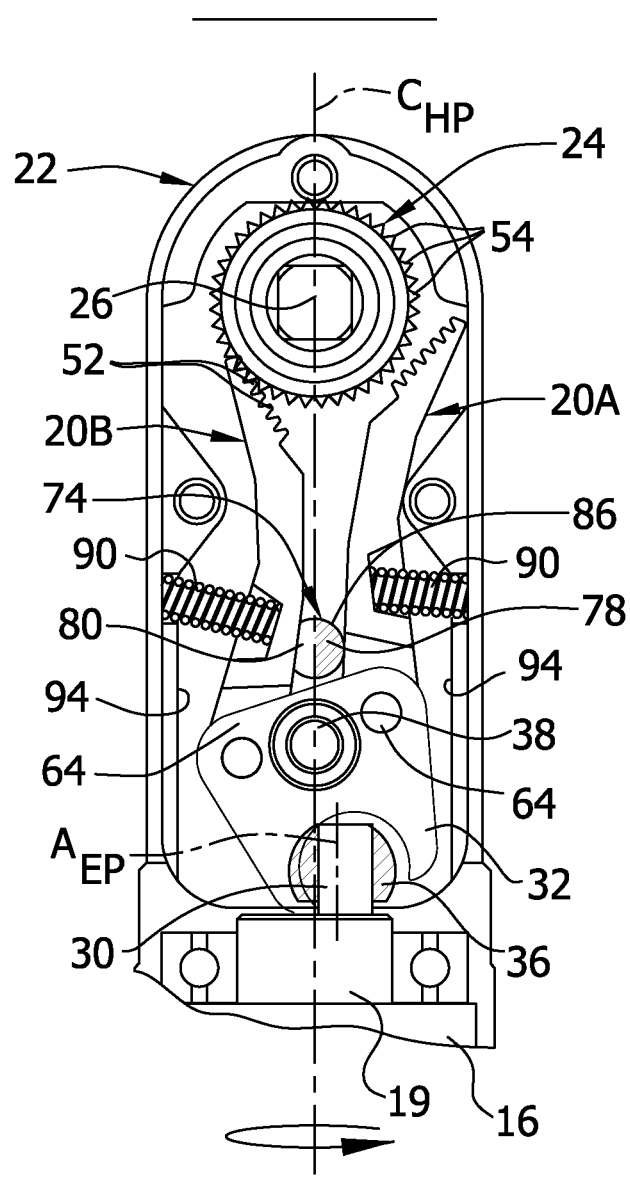
FIG. 16 is the elevation of FIG. 11B with the reversing pawl shown in its initial position seated against the output member.

After the eccentric projection 30 reaches its left-most position, it moves back toward the centerline $C_{HP}$, whereby the reversing pawl 20B lowers and moves laterally inward toward the centerline $C_{HP}$ (FIG. 15). Although the teeth 52 of the pawl 20B continue to engage the output member 24 because of the springs 90, the output member 24 does not counter-rotate (i.e., move in the reverse direction) as the pawl moves downward. Instead, the teeth 52 of the pawl 20B slide down the teeth 54 of the output member 24 in the manner of a ratchet until the eccentric projection 30 reaches its right-most position, whereby the reversing pawl 20B is once again in its initial position (FIG. 16).

The operation of the ratchet 10 in the forward-driving operation is substantially the same as the operation of the ratchet in the reverse-driving operation, with the exceptions of the forwarding pawl 20A engaging the output member 24 (see, FIG. 11B) as opposed to the reversing pawl 20B, the engagement surface 86 engaging the reversing pawl, as opposed to the forwarding pawl, and forcing the reversing pawl away from the output member (see, FIG. 11B), and the output member rotating counterclockwise as opposed to clockwise (as viewed in FIG. 11B).

Having described the invention in detail, it will be apparent that modifications and variations are possible without departing from the scope of the invention defined in the appended claims.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A ratchet drive comprising:
   a housing including a head having a longitudinal centerline, said head including an interior cavity having a neck separating an upper part and a lower part, said neck being defined by opposing elements protruding into the interior cavity;
   a motor disposed in the housing, the motor including a rotatable drive shaft;
   a rocker disposed pivotably within the lower part of the interior cavity in the head of the housing and operatively connected to the drive shaft so that rotation of the drive shaft causes oscillation of the rocker;
   an output member having teeth extending around a circumferential surface of the output member, the output member being mounted in the upper part of the interior cavity in the head of the housing for rotation about its longitudinal axis and projecting from the head for transmitting torque to an object; and
   a pair of elongate pawls pivotably attached to the rocker, each pawl having a lower portion pivotably secured to the rocker in the lower part of the interior cavity in the head and extending upward past the neck of the interior cavity, and an upper portion in the upper part of the interior cavity in the head comprising teeth engaging the output member teeth to turn the output member, each elongate pawl having a bend between the upper portion and the lower portion so that the upper portion extends outward at a skewed angle with respect to the lower portion so the elongate pawls are spaced from the opposing elements protruding into the interior cavity while at least one of the teeth of the upper portion of the respective pawl engages the teeth extending around the circumferential surface of the output member as the rocker pivots through its entire stroke, said pawls being maintained in a spaced relationship in the housing so that the pawls do not cross over each other.

2. A ratchet drive as set forth in claim 1 wherein each pawl has an intermediate portion between the upper portion and the lower portion, the intermediate portion extending outward from the lower portion at a first angle other than 180 degrees measured relative to the lower portion and the upper portion extending outward from the intermediate portion at a second angle other than 180 degrees measured relative to the intermediate portion, each pawl having a planer outer surface, at least some of the upper, lower, and intermediate portions of each pawl extending along said planar outer surface so that each of said first and second angles is formed in the planar outer surface.

3. A ratchet drive as set forth in claim 1 wherein one of the pawls constitutes a forward pawl and the other pawl constitutes a reverse pawl, the ratchet drive further comprising a reversing switch mechanism for configuring the ratchet drive between a forward-driving configuration, in which the forward pawl engages the teeth of the output member for driving the output member clockwise as viewed from a rear of the ratchet drive and the reverse pawl does not engage the teeth of the output member, and a reverse-driving configuration, in which the reverse pawl engages the teeth of the output member for driving the output member counterclockwise as viewed from the rear of the ratchet drive and the forward pawl does not engage the teeth of the output member.

4. A ratchet drive as set forth in claim 3 wherein the reversing switch mechanism comprises a cam disposed between the pawls, the cam having a groove and being mounted on the housing for moving between the forward-driving configuration in which the groove receives the forward pawl and the reverse-driving configuration in which the groove receives the reverse pawl.

5. A ratchet drive as set forth in claim 4 wherein the cam defines an engagement surface for contacting the reverse pawl and disengaging the reverse pawl from the output member when the ratchet drive is configured in the forward-driving configuration and for contacting the forward pawl and disengaging the forward pawl from the output member when the ratchet drive is configured in the reverse-driving configuration.

6. A ratchet drive as set forth in claim 3 wherein each of the pawls defines a cavity therein, the ratchet drive further comprising:
   a first compression spring engaging the housing and the cavity of the forward pawl for biasing the forward pawl toward the centerline of the head and into engagement with the output member; and
   a second compression spring engaging the housing and the cavity of the reverse pawl for biasing the reverse pawl toward the centerline of the head and into engagement with the output member.

7. A ratchet drive as set forth in claim 1 wherein the output member includes a fitting sized and shaped for rotating a fastener element.

8. A ratchet drive as set forth in claim 7 wherein the housing further comprises a lower portion sized and shaped to be held in one hand.

9. A ratchet drive as set forth in claim 8 wherein the motor comprises an air motor.

10. A ratchet drive comprising:
    a housing including a head having a longitudinal centerline, said head including an interior cavity having a neck separating an upper part and a lower part, said neck being defined by opposing elements protruding into the interior cavity;
    a motor disposed in the housing, the motor including a rotatable drive shaft;
    a rocker disposed pivotably within the lower part of the interior cavity in the head of the housing and operatively connected to the drive shaft so that rotation of the drive shaft causes oscillation of the rocker;
    an output member having teeth, the output member being mounted in the upper part of the interior cavity in the head of the housing for rotation about its longitudinal axis and projecting from the head for transmitting torque to an object; and
    a pair of elongate pawls pivotably attached to the rocker, each pawl having a lower portion pivotably secured to the rocker in the lower part of the interior cavity in the head and extending upward past the neck of the interior cavity, an upper portion in the upper part of the interior cavity in the head comprising teeth engaging the output member teeth to turn the output member, and a planar outer surface, the lower and upper portions being defined at least partially by the planar outer surface, and wherein each elongate pawl has at least two bends in said planar outer surface between the upper portion and the lower portion so that the upper portion extends outward at a skewed angle with respect to the lower portion so the elongate pawls are spaced from the opposing elements protruding into the interior cavity while the rocker pivots through its entire stroke, said pawls being maintained in a spaced relationship in the housing so that the pawls do not cross over each other.

\* \* \* \* \*